(12) United States Patent
Rhome (10) Patent No.: US 7,814,825 B2
(45) Date of Patent: Oct. 19, 2010

(54) OIL DELIVERY SYSTEM FOR A POPCORN POPPING MACHINE

(75) Inventor: Timothy Rhome, Fairfield, OH (US)

(73) Assignee: Gold Medal Products Company, Cincinnati, OH (US)

( * ) Notice: Subject to any disclaimer, the term of this patent is extended or adjusted under 35 U.S.C. 154(b) by 1146 days.

(21) Appl. No.: 10/971,640

(22) Filed: Oct. 22, 2004

(65) Prior Publication Data

US 2006/0086257 A1    Apr. 27, 2006

(51) Int. Cl.
*A23L 1/18* (2006.01)

(52) U.S. Cl. .................... 99/323.5; 99/323.7; 222/1; 222/105

(58) Field of Classification Search ............. 99/323.4, 99/323.5, 323.6, 323.7, 323.8, 323.9, 323.11; 222/71, 105
See application file for complete search history.

(56) References Cited

U.S. PATENT DOCUMENTS

| | | | |
|---|---|---|---|
| 1,545,357 A | 7/1925 | Schwimmer | 99/323.8 |
| 2,123,663 A | 7/1938 | Roach | 53/4 |
| 2,812,704 A | 11/1957 | Hawks | 99/238.2 |
| 2,856,841 A | 10/1958 | Cretors et al. | 99/238 |
| 2,939,379 A | 6/1960 | Schmitt | 99/238.4 |
| 3,641,916 A | 2/1972 | McDevitt et al. | 99/238.3 |
| 3,739,953 A | 6/1973 | Cretors | 222/318 |
| 3,812,774 A * | 5/1974 | Day et al. | 99/323.8 |
| 4,133,456 A | 1/1979 | Corini | 222/146 HE |
| 4,182,229 A | 1/1980 | VandeWalker | 99/323.6 |
| 4,421,146 A | 12/1983 | Bond et al. | 141/349 |
| 4,484,697 A | 11/1984 | Fry, Jr. | 222/95 |
| 4,557,399 A | 12/1985 | Redick, Jr. | 222/83.5 |
| 4,723,688 A | 2/1988 | Munoz | 222/88 |

(Continued)

FOREIGN PATENT DOCUMENTS

EP    364071    4/1990

(Continued)

OTHER PUBLICATIONS

Cleland Sales Corporation, *Compact Bag In Box Dispensers and Carts*, Brochure, Los Alamitos, CA, Jun. 1, 1992 (1 page).

(Continued)

*Primary Examiner*—Reginald L Alexander
(74) *Attorney, Agent, or Firm*—Wood, Herron & Evans, LLP (57) ABSTRACT

An oil delivery system for a popcorn popping machine to deliver cooking oil to a kettle of the popping machine. In one embodiment, the oil delivery system includes more or more containers of oil which are supported within a cabinet of the popping machine so that the outlet of each container is facing downwardly so as to be oriented along a vertical axis. Flexible tubing is provided to connect the outlets of the containers to a pump of the oil delivery system. Each container may comprise a flexible bag which is enclosed in a rectangular box. The outlets of the flexible bags include quick connect/disconnect connectors which are connected with quick connect/disconnect connectors provided on the flexible tubing. The oil delivery system is provided with a flow sensor to detect when a container of oil is empty and provide an alert to an operator to remove and replace the container with a filled container. An electronic valve is provided in the oil delivery system to control the flow of oil from the containers.

17 Claims, 7 Drawing Sheets

U.S. PATENT DOCUMENTS

| | | | | |
|---|---|---|---|---|
| 4,919,308 | A | 4/1990 | Majkrzak | 222/146.5 |
| 5,026,969 | A | 6/1991 | Knepler et al. | 219/421 |
| 5,114,045 | A | 5/1992 | Herpe | 222/105 |
| 5,121,857 | A | 6/1992 | Hutchinson | 222/318 |
| 5,301,601 | A | 4/1994 | Cretors | 99/323.5 |
| 5,566,863 | A | 10/1996 | Mesenbring et al. | 222/132 |
| 5,660,869 | A | 8/1997 | Weiss | 426/417 |
| 5,876,071 | A * | 3/1999 | Aldridge | 285/321 |
| 6,453,955 | B1 * | 9/2002 | Lee | 141/198 |
| 7,082,891 | B2 * | 8/2006 | Watson | 118/24 |

OTHER PUBLICATIONS

Cleland Sales Corporation, *Bag In Box Liquid Chocolate Dispenser Model CLW-BIB*, Brochure for Dove Liquid Chocolate Dispenser, Los Alamitos, CA (Date Unknown) (2 pages).

Cleland Sales Corporation, *Auto-Mix Gas or Electric Syrup Pump Flow Chart*, Brochure for Part #8400-4 Component AM103 S-BIB Automix (Date Unknown) (2 pages).

Cleland Sales Corporation, *AM103S-BIB Bag In Box Automix*, Brochure shown installed on the Jet Spray model JT20, UL File # SA5731(S), Los Alamitos, CA (Date Unknown) (2 pages).

Cleland Sales Corporation, *AM103S-BIB Bag In Box Automix*, Brochure shown installed on the Crathco model D25-4, UL File # SA5731(S), Los Alamitos, CA (Date Unknown) (2 pages).

C. Cretors and Company *Cretors' New "Bag In The Box Pump" Solves The Oil Crisis*, Brochure for Model 7900 Pump (Date Unknown) (1 page).

Ken Zehnder & Associates, Inc., *Zehnder/QCD III Condiment Cart*, Brochure, Crestline, OH (Date Unknown) (4 pages).

Ken Zehnder & Associates, Inc. *Bag In Box Pumps & Accessories*, Brochure, New For 1991, Supplement 1-2 (Date Unknown) (2 pages).

Liqui-Box Corporation/B-Bar-B, *Innovative Packaging Systems for the Edible Oils Market*, 1991 Brochure, Worthington, OH (6 pages).

Odell's, *Odell's Canola Oil in a Box?*, Brochure for Odell's New Bag-In-The-Box, Reno, Nevada (Date Unknown) (2 pages).

Patrick Cudahy, *New Vegline edible oils in New recyclable and environmentally friendly packaging*, Brochure for Bag-in-the-Box Packaging, Cudahy, WI (Date Unknown) (2 pages).

* cited by examiner

OIL DELIVERY SYSTEM FOR A POPCORN POPPING MACHINE

FIELD OF THE INVENTION

The present invention relates generally to popcorn popping machines and, more particularly, to an oil delivery system for delivering cooking oil to a kettle of the popping machine.

BACKGROUND OF THE INVENTION

Popcorn is mass-produced for sale at movies and other events in commercial popcorn popping machines which include an enclosed transparent cabinet containing a tiltable kettle suspended above a catch area or platform. The kettle is heated and uncooked popcorn kernels are placed therein with oil delivered to the kettle from an oil pump system to be cooked and popped. Once the kernels are popped, the kettle is either manually or automatically tilted to dump the popped popcorn onto the platform to be scooped up, packaged and sold to customers.

The delivery of the proper amount of cooking oil to the kettle for each popping cycle is critical to ensure that the popcorn is consistently and properly cooked in consecutive batches. If too little oil, or worse yet no oil, is delivered to the kettle at the beginning of the popping cycle, the popped popcorn and uncooked popcorn kernels will burn within the heated kettle. In addition to the waste of burned popcorn and uncooked corn kernels, the aroma of the burned popcorn is not attractive to customers and may actually discourage purchases. Furthermore, if the operator inadvertently dumps the burned popcorn and uncooked kernels onto the platform, it will contaminate the usable popcorn which has already been produced and may render the entire batch inedible and thus unusable.

Known popping systems generally rely on an operator to observe when no oil is being delivered at the beginning of the popping cycle. When this occurs, the operator knows that the container of oil is empty and needs to be replaced with a filled container. However, an operator may be busy with other duties when this occurs and therefore not be aware the container of oil is empty before the next popping cycle is started.

In the past, cooking oil has been supplied in large buckets or pails. The oil is pumped to the kettle of the popping machine through a pump which is submerged into the oil within the bucket. A heater is provided with the pump to heat and liquefy the oil which otherwise tends to solidify at room temperature. The pump is connected through a passageway to an oil outlet located above the kettle. When the pump is activated, it draws oil from the bucket and delivers the oil to the kettle in measured amounts for the consecutive popcorn popping cycles.

One known drawback of this method of oil delivery is that the buckets of oil, which may weigh as much as fifty pounds, are difficult to handle. Also, when the bucket is empty of oil, the pump must be withdrawn from the bucket and then submerged into another filled bucket. During the changeover of buckets, the oil may drip from the pump onto the floor around the area of popping machine and the oily pump is messy for the operator to handle.

It is known to provide cooking oil in flexible plastic bags which are enclosed in a rectangular cardboard box, commonly referred to as "bag-in-a-box" containers. Such containers of oil are much easier to handle since the pump is mounted in the cabinet of the popping machine and therefore separate from the container of oil. The container of oil is connected to the pump through a flexible tubing. The flexible tubing has a quick connect/disconnect connector provided on one end which connects with a quick connect/disconnect connector provided on the flexible bag of the container.

In known popcorn popping systems that use this type of "bag-in-a-box" container of oil, the container is supported on an inclined shelf so that the container of oil is tilted at an angle. While this tilting of the container improves movement of the oil toward the outlet of the container, there is still an area within the flexible bag in which the oil can become trapped. While the oil is drawn from the flexible bag by the pump, the bag collapses within the cardboard box. However, the drawing capacity of the pump is typically not sufficient to completely collapse the bag so that some of the oil becomes trapped below the outlet of the tilted container. This results in some waste of the cooking oil which can be relatively costly over time.

Therefore, there is a need for an oil delivery system for use in a popcorn popping machine to deliver cooking oil to a kettle which addresses these and other known shortcomings and drawbacks of known oil delivery systems.

SUMMARY OF THE INVENTION

The present invention overcomes the foregoing and other shortcomings and drawbacks of oil delivery systems heretofore known for delivering cooking oil to a kettle of a popcorn popping machine. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, an oil delivery system is provided to deliver cooking oil to the kettle of a popcorn popping machine. In one embodiment, the oil delivery system includes one or more containers of oil which are supported within a cabinet of the popping machine so that the outlet of each container is facing downwardly so as to be oriented along a vertical axis. Flexible tubing is provided to connect the outlets of the containers to a pump of the oil delivery system. The pump is provided to draw the oil from the containers and deliver the oil to the kettle at the beginning of each popping cycle. The inverted position of the containers assures that essentially all of the oil will be withdrawn from the containers since there is no area within the containers in which the oil can become trapped.

According to another aspect of the present invention, the containers comprise flexible bags filled with oil which are enclosed in a rectangular cardboard box. The outlets of the flexible bags include quick connect/disconnect connectors which are connected to quick connect/disconnect connectors provided on the flexible tubing. The quick connect/disconnect connection scheme of present invention allows the containers of oil to be inverted and loaded into the popping machine without spillage of oil so that other connections of the flexible tubing can be made. The quick connect/disconnect connection scheme of the present invention simplifies loading and unloading of the containers with minimal spillage of oil and facilitates easy handling of the containers in both their upright and inverted positions.

According to another aspect of the present invention, the oil delivery system is provided with a flow sensor to detect when a container of oil is essentially empty. The flow sensor is coupled to an alarm so that when a container is detected to be empty, the flow sensor activates the alarm to alert an operator to remove and replace the empty container with a filled container. The alarm may be provided to an operator in the form of a visual or audible alarm, or both. In this way, the operator is alerted when a container of oil is empty so that the likelihood of wasted batches of popcorn due to insufficient amounts of oil is greatly reduced.

In one embodiment, the containers of oil are placed in front-and back or side-by side relationship within the cabinet of the popcorn popping machine. The containers are fluidly connected together and also to the pump through the flexible tubing to deliver oil to the kettle. A normally closed electronic valve is provided so that the pump only draws from one of the containers at a time. The electronic valve is coupled to the flow sensor so that valve opens when the flow sensor detects that one of the containers is empty. In this way, one of the containers functions as a primary source of oil and the other container functions as a temporary oil reserve to reduce or eliminate interruptions in the supply of oil to the kettle during the popping cycles.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE PREFERRED EMBODIMENT

Figure 1:
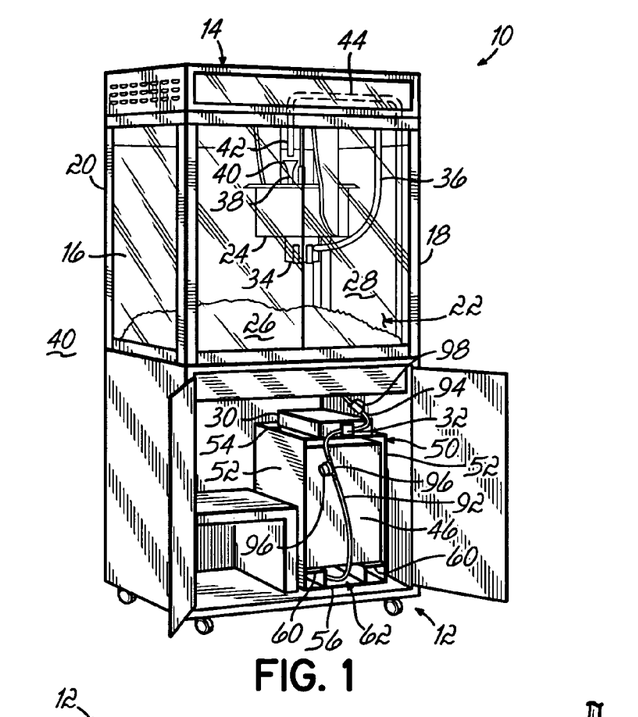
FIG. 1 is a perspective view of an exemplary popcorn popping machine incorporating an oil delivery system according to a first embodiment of the present invention.
Figure 2:
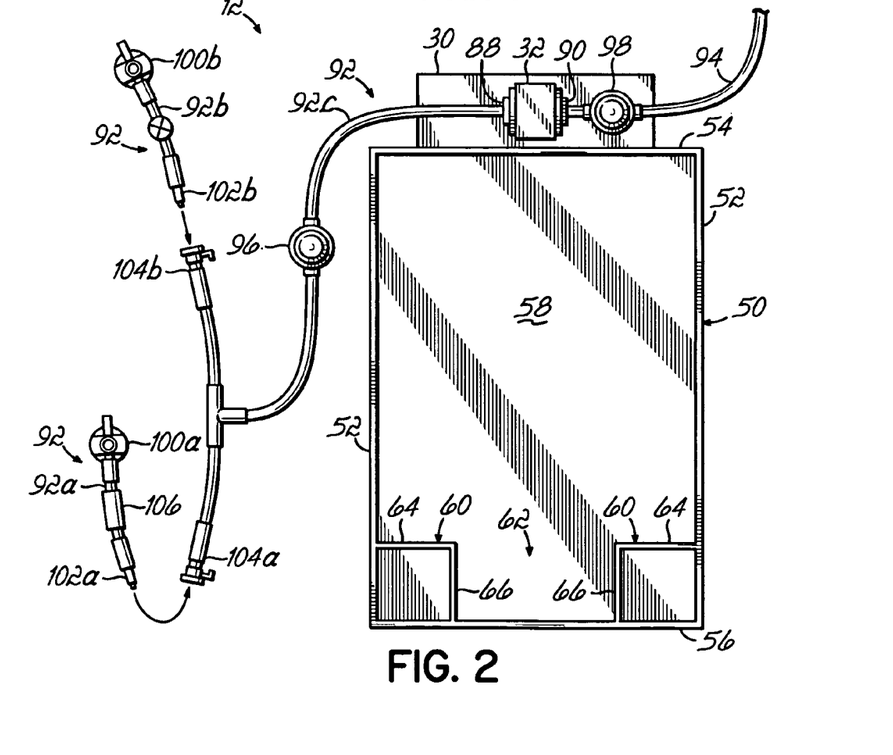
FIG. 2 is a front elevational view of the delivery system shown in FIG. 1 with the containers of oil removed.

Referring now to the figures, and to FIG. 1 in particular, an exemplary popcorn popping machine 10 is shown incorporating an oil delivery system 12 according to one embodiment of the present invention. It will be appreciated that popping machine 10 is operable to cook or to pop popcorn and is particularly useful for cooking consecutive batches of popcorn for sale by concessionares at movie theaters, sports events, fairs and the like.

The popping machine 10 includes a cabinet 14 having transparent walls including two sidewalls 16, 18, a rear wall 20, front wall 22 and a service platform (not shown) for catching popped popcorn from the kettle 24. Front wall 22 includes two doors 26, 28 which can be opened to gain access both to the popped popcorn on the platform of the cabinet 14 and to the kettle 24. Sidewalls 16,18 and rear wall 20, as well as the front wall 22 including doors 26, 28, are all made preferably of transparent glass or plastic material so that the interior of the cabinet 14 can be viewed from the exterior. The cabinet 14 may also include various operating switches and light indicators on an operating panel (not shown) for turning ON kettle heat, the dump motor, a warmer (not shown) under the platform and lights inside the cabinet 14. The operating switches also turn on the heater 30 and pump 32 (see FIGS. 2-3, 4A and 4B) of the oil delivery system 12 for delivering cooking oil to the kettle 24 during a popping cycle as will be described in greater detail below.

The popping kettle 24 is of any suitable variety having a heater 34 (FIG. 1) interconnected by a line 36 to a power plug (not shown) mounted inside the top of the cabinet 14. It will be appreciated that the kettle 24 is tiltable to dump popped popcorn onto the service platform at the completion of a popping cycle. The tilting of the kettle 24 may be automatically controlled by a dump motor (not shown) or, alternatively, the kettle 24 may be manually dumped by an operator. As is well known in the art, kettle 24 is provided with a pair of covers (not shown) which are pivoted on the kettle 24. When the corn is popped, it pushes the covers (not shown) open and falls out the sides of the kettle 24 onto the platform. One of the covers (not shown) is located over a so-called "dump section" or side of the kettle 24. When the kettle 24 is tilted, the one cover (not shown) pivots open to facilitate dumping of the popped popcorn onto the platform.

Positioned between the pair of covers (not shown) is an oil funnel 38 (FIG. 1) which has a flared funnel mouth 40. When the kettle is upright as shown in FIG. 1, the funnel 38 aligns with an oil outlet 42 which is fluidly connected via a delivery tube 44 to the pump 32 of the oil delivery system 12. Oil is pumped up by the delivery system 12 to be delivered into the funnel 38 and kettle 24 during a popping cycle as described in greater detail below.

The delivery system 12 is the focus of the present invention and is illustrated and described in detail below in connection with delivering oil from one or more containers of oil to the kettle 24 for use in a popping cycle. According to one aspect of the present invention, as shown in FIGS. 1-3, 4A and 6, the delivery system 12 includes a pair of containers 46, 48 which contain a suitable cooking oil, such as coconut oil or the like, and are mounted on their top ends within a housing 50 located in the cabinet 14 below the service platform. The housing 50 includes a pair of opposing sidewalls 52, a top wall 54, a bottom wall 56 and a rear wall 58. The containers 46, 48 are supported in a front-and-back relationship on a pair of elongated support rails 60 which are spaced apart within the housing 50 and define an elongated cavity 62 therebetween. Each support rail 60 has a generally horizontal leg 64 which extends inwardly from a sidewall 52 of the housing 50 and a generally vertical leg 66 which extends from an inner edge of the horizontal leg 64 to the bottom wall 56 of the housing 50.

In one embodiment, each of the containers 46, 48 includes a flexible bag 68, 70 (FIG. 3) which is filled with cooking oil and a rectangular box 72, 74 which encloses the bag 68, 70. The boxes 72, 74 may be formed of cardboard or other suitable material which is sufficiently strong to contain the filled bags 68, 70, lightweight, and preferably recyclable as is well known in the art. Alternatively, the containers may comprise buckets of oil (not shown) in which a pump is submerged to pump oil to the kettle 24. The present invention is therefore not limited to flexible bags in a box but rather contemplates a variety of oil containers which are suitable for use with the delivery system 10.

Figure 3:
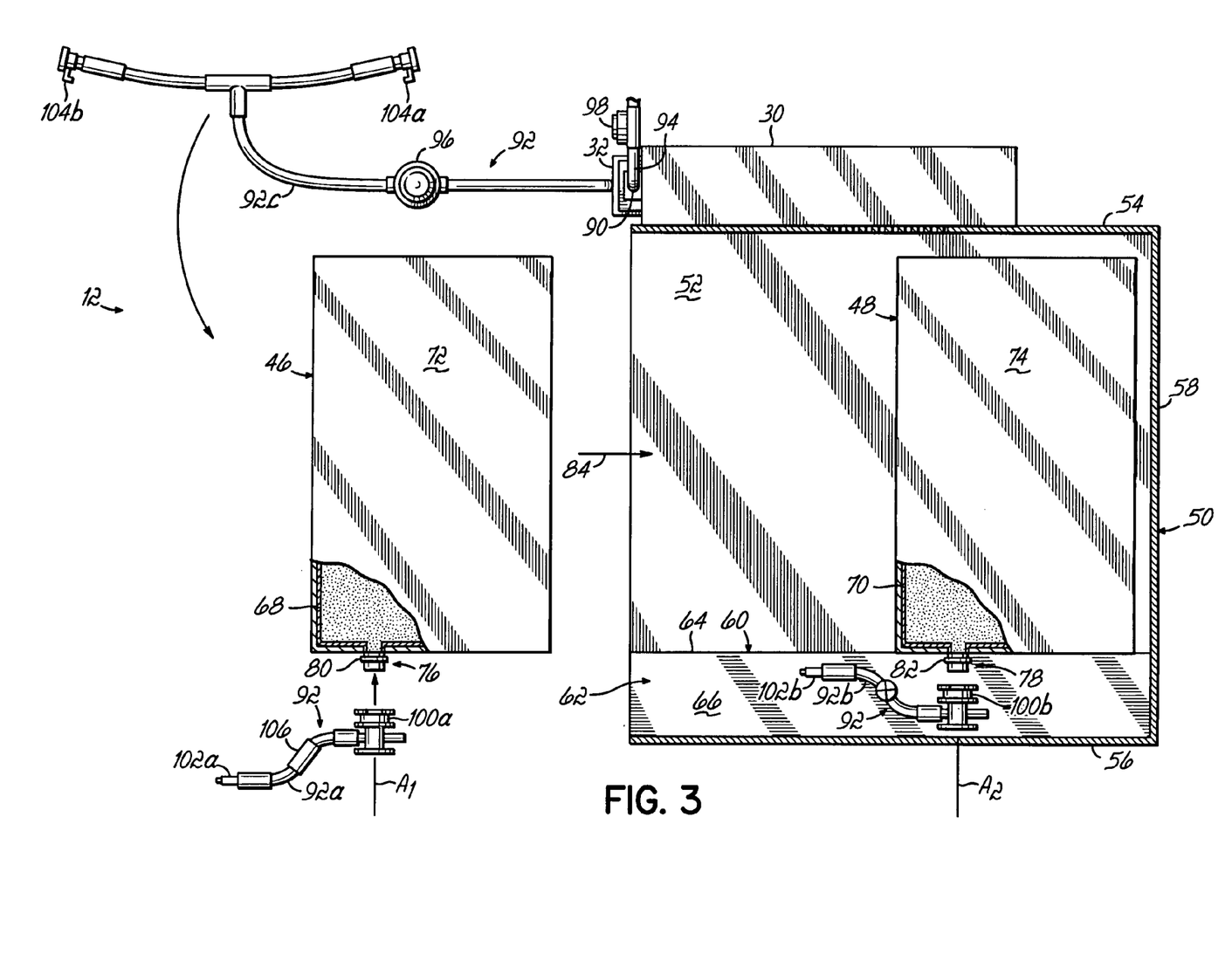
FIG. 3 is a side elevational view of the delivery system of FIG. 1 showing the delivery system disassembled.

Further referring to FIG. 3, each container 46, 48 includes an outlet 76, 78 provided on a top end of the container 46, 48 which is in fluid communication with the interior of the bag 68, 70 containing the oil. In one embodiment, each outlet 76, 78 comprises a quick connect/disconnect connector 80, 82 which is oriented along a substantially vertical axis $A_1$, $A_2$ (FIG. 3) when the containers 46, 48 are inverted and positioned on their top ends within the housing 50 as shown in FIG. 3. The inverted position of the containers 46, 48 assures that essentially all of the oil will be eventually drawn from one or both of the containers 46, 48 following numerous popping cycles. This minimizes waste of the oil which may otherwise occur if the containers 46, 48 are placed on their sides or they are supported at an some angle.

The top ends of the containers 46, 48 are supported on the support rails 60 such that the connectors 80, 82 extend into the cavity 62 formed between the support rails 60 and are spaced above the bottom wall 56. In this way, the containers 46, 48 can be inverted with their top ends facing downwardly and placed upon the support rails 60 and then pushed rearwardly along the support rails 60 in a generally horizontal direction, as represented by arrow 84 in FIG. 3, into the housing 50. The cavity 62 provides a clearance for the connectors 80, 82 between the support rails 60 to facilitate the horizontal loading of the containers 46, 48 within the housing 50.

Figure 4A:
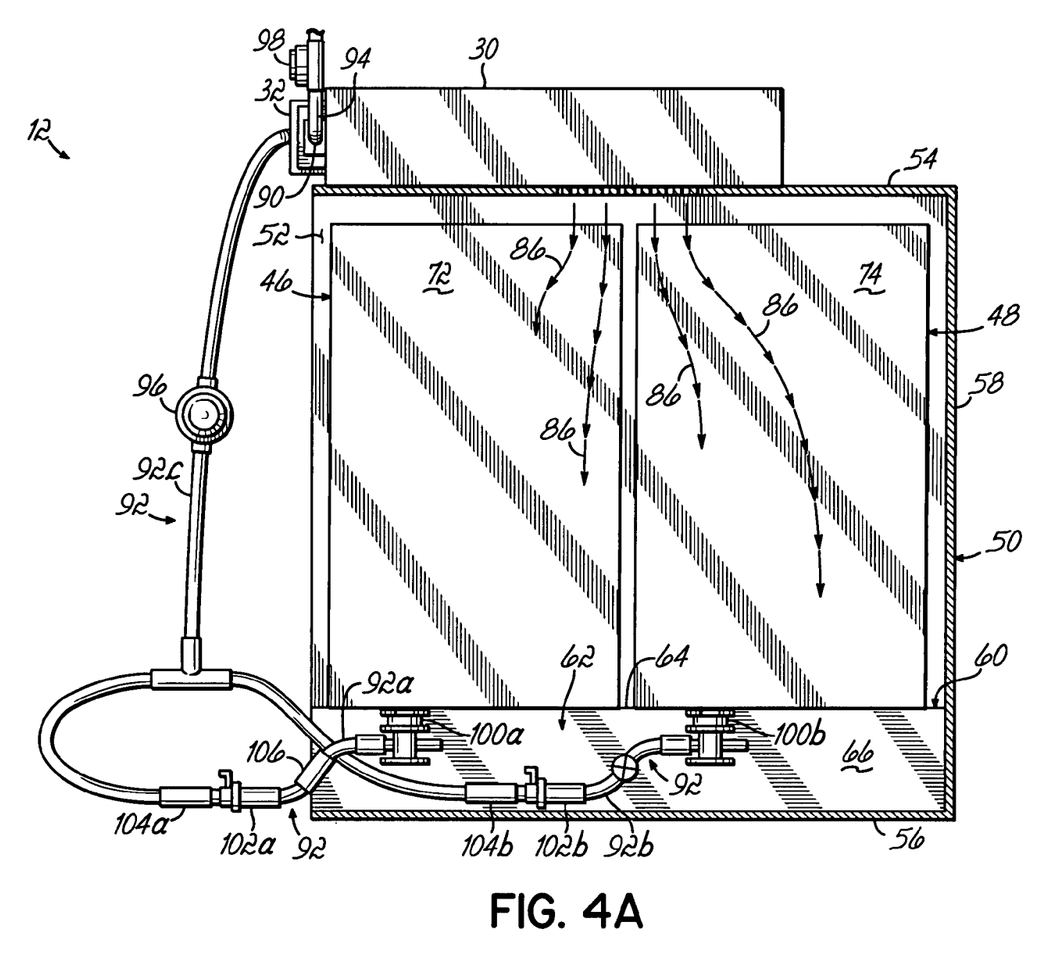
FIG. 4A is a view similar to FIG. 3 showing the delivery system assembled.

In one embodiment, the heater 30 is provided on the top wall 54 of the housing 50 and is operable to force heated convection air, shown diagrammatically by numeral 86 in FIG. 4A, into the interior of the housing 50 and around the containers 46, 48. Coconut oil typically solidifies at room temperature so the heated convection air 86 is required to liquefy the oil within the flexible bags 68, 70 before it is delivered to the kettle 24. Of course, those skilled in the art will appreciate that other methods of heating the containers 46, 48 are possible as well.

Further referring to FIGS. 1-3, 4A and 6, the pump 32 of the delivery system 12 is also provided on the top wall 54 of the housing 50 and includes an inlet 88 (FIG. 2) in fluid communication with the containers 46, 48 and an outlet 90 (FIG. 2) in fluid communication with the oil outlet 42 for delivering oil to the kettle 24. Flexible tubing 92 is provided to fluidly connect the outlets 76, 78 of the containers 46, 48 in parallel to the inlet 88 of the pump 32, and flexible tubing 94 is provided to fluidly connect the outlet 90 of the pump 32 to the oil outlet 42. Oil filters 96, 98 are provided in fluid communication with the flexible tubing 92, 94 to clean the oil and oil filter 98 also reduce bubbles which may form in the flexible tubing 94 as a result of operation of the pump 32. Also, it will be appreciated that heated coils (not shown) may be provided on the flexible tubing 92, 94 to prevent the oil from solidifying in the tubing 92, 94.

Figure 7:
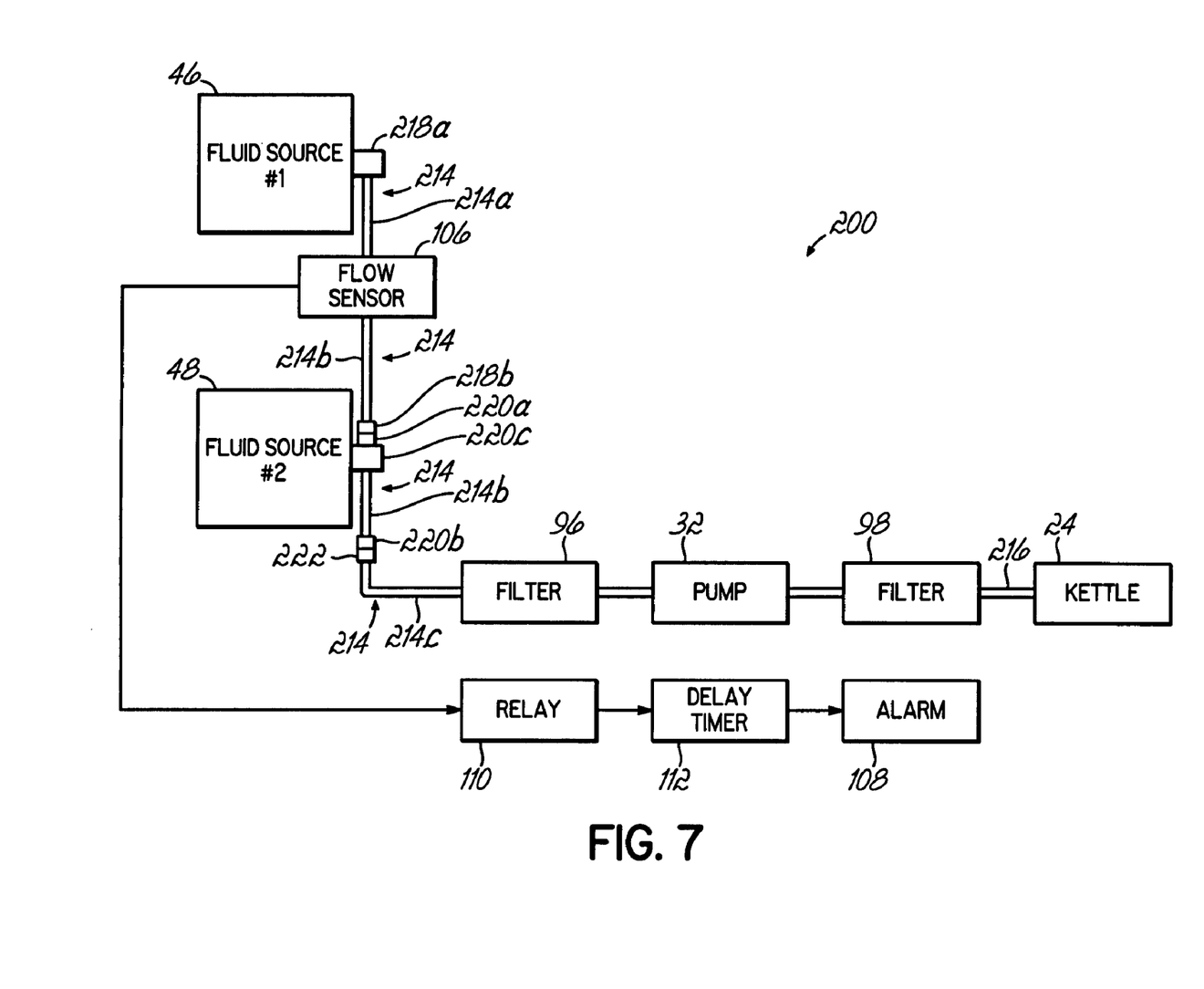
FIG. 7 is a diagrammatic view of the delivery system shown in FIG. 4B.

According to another aspect of the present invention, the tubing 92 has multiple tubing sections 92a-c which are interconnected to define a passageway between the outlets 76, 78 of the containers 46, 48 and the inlet 88 of the pump 32. Each tubing section 92a, 92b has one quick connect/disconnect connector 100a, 100b provided at one end of the tubing section 92a, 92b and another quick connect/disconnect connector 102a, 102b provided at its opposite end. As shown in FIGS. 3, 4A and 7, the quick connect/disconnect connector 100a provided at the one end of tubing section 92a is fluidly connected with the quick connect/disconnect connector 80 provided on the flexible bag 68 of container 46. When the connection is made, the connector 80 provided on the flexible bag 68 opens so that oil fills the tubing section 92a but the connector 102a prevents the oil from exiting the tubing section 92a until further connections are made as described below. Likewise, the quick connect/disconnect connector 100b provided at the one end of tubing section 92b is fluidly connected with the quick connect/disconnect connector 82 provided on the flexible bag 70 of container 48. This connection opens the connector 82 provided on the flexible bag 70 so that oil fills the tubing section 92b but the connector 102b prevents the oil from exiting the tubing section 92b in a similar fashion to the connector 102a. In this way, the tubing sections 92a, 92b can be connected to the outlets 76, 78 of the containers 46, 48 when the containers 46, 48 are in their upright positions. Thereafter, the containers 46, 48 can be inverted and loaded into the housing 50 with their tops facing downwardly without any spillage of oil from either container 46, 48 so that other connections of the flexible tubing 92 can be easily made for delivery of oil to the kettle 24.

Figure 6:
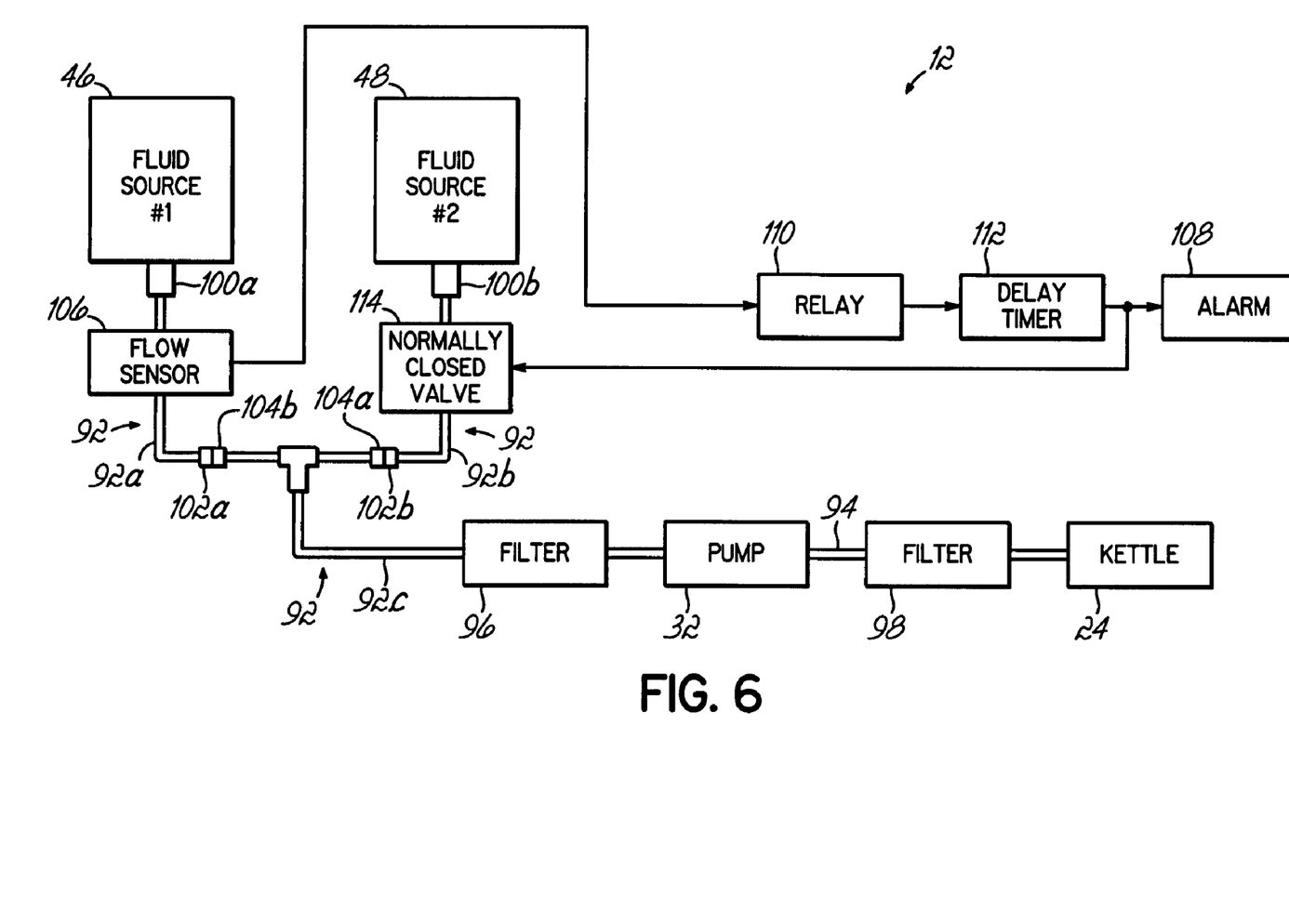
FIG. 6 is a diagrammatic view of the delivery system shown in FIG. 1.

Tubing section 92c is generally T-shaped and has a pair of quick connect/disconnect connectors 104a, 104b provided at a pair of ends of the tubing section 92c and its opposite end is fluidly connected with the inlet 88 of the pump 32. As shown in FIGS. 3, 4A and 6, the pair of quick connect/disconnect connectors 104a, 104b provided at the pair of ends of tubing section 92c are fluidly connected with the quick connect/disconnect connectors 102a, 102b provided on the opposite ends of the tubing sections 92a, 92b. When the connections are made, the connectors 102a, 102b provided on the opposite ends of the tubing sections 92a, 92b open so that passageways are established between the outlets 76, 78 of the containers 46, 48 and the inlet 88 of the pump 32. It will be appreciated that the quick connect/disconnect connection scheme of the present invention simplifies loading and unloading of the containers 46, 48 with minimal spillage of oil and facilitates easy handling of the containers 46, 48 in both their upright and inverted positions.

According to another aspect of the present invention as shown in FIGS. 2, 3, 4A and 6, a flow sensor 106 is provided in fluid communication with the tubing section 92a. The flow sensor 106 is operable to detect an absence of flow of oil in the tubing section 92a such as when the container 46 is essentially empty of oil. The flow sensor 106 is electrically coupled to an indicator 108 to provide a visual or audible alarm, or both, to an operator when an absence of oil flow in the tubing section 92a is detected by the flow sensor 106. The alarm is provided to alert the operator to remove and replace the empty container 46 with a filled container. The visual alarm may be a flashing or steady light indicator mounted on the cabinet 14. The audible alarm may be an intermittent or steady tone generated by a speaker (not shown) supported by the cabinet 14. One suitable flow sensor 106 for use in the present invention is the Model 197092 flow sensor commercially available from Gems Sensors of Plainville, Conn., although other suitable flow sensors are possible as well without departing from the spirit and scope of the present invention. As used herein, the terminology "absence of flow" is intended to mean that either no flow of oil is detected or the flow rate of the oil is detected to be below a predetermined flow rate threshold. It will be appreciated that the detection of the oil flow rate may be detected either mechanically or electrically as will be understood by those skilled in the art.

In one embodiment as shown in FIG. 6, the flow sensor 106 is electrically coupled to the alarm 108 through a relay 110 and a delay timer 112. The delay timer 112 is provided so that the flow sensor 106 does not generate an alarm through the alarm 108 when the pump 32 is initially turned on and is not yet drawing oil from the container 46 at its predetermined draw capacity. In this way, false alarms are avoided which may otherwise be distracting to an operator of the popping system.

According to another aspect of the present invention, an electronic valve 114 is provided in fluid communication with the tubing section 92b and is electrically coupled to the flow sensor 106 as shown in FIGS. 2, 3, 4A and 6. The electronic valve 114 is normally closed so that the pump 32 only draws oil from the front container 46 when the flow sensor 106 is not activated (i.e., oil is flowing in the tubing section 92a). However, when the front container 46 is empty of oil as detected by the flow sensor 106, the flow sensor 106 activates the electronic valve 114 to open so that a passageway is established through the tubing section 92b and the flow sensor 106 activates the alarm 108 to alert an operator to replace the front container 46 with another filled container of oil. The pump 32 now draws oil from the rear container 48 so that the supply of oil is not interrupted while the empty front container 46 is being replaced.

When the front container 46 has been removed and replaced with a filled container, the electronic valve 114 is deactivated to its normally closed position so that the pump 32 resumes to draw oil only from the front container 46. In this way, the front container 46 functions as a primary source of oil and the rear container 48 functions as a temporary oil reserve to reduce or eliminate interruptions in the supply of oil to the kettle 24 during the popping cycles. Thus, it will be appreciated that the rear container 48 will need to be replaced much less frequently than the front container 46.

As shown in FIG. 6, the flow sensor 106 is coupled to the electronic valve 114 through the relay 110 and the delay timer 112. In this way, the electronic valve 114 will not be prematurely opened when the pump 32 is initially turned on and is not yet drawing oil from the container 46 at its predetermined draw capacity. It will be appreciated that while the containers 46, 48 are shown and described as being positioned in a front-and back relationship, the containers 46, 48 may alternatively be placed in a side-by-side relationship, tilted, or any other orientation as well without departing from the spirit and scope of the present invention. Also, it will be appreciated that more than two containers of oil are possible with the oil delivery system 10 of the present invention.

Figure 4B:
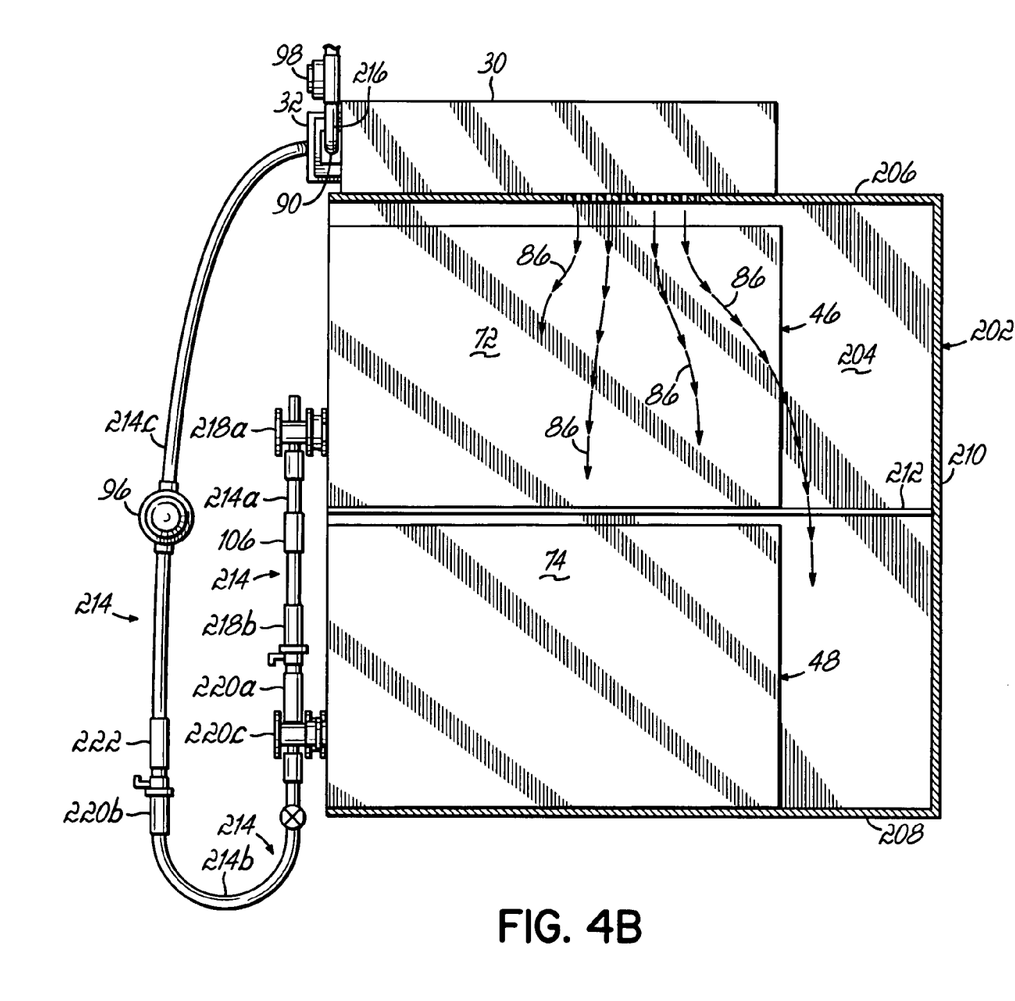
FIG. 4B is a side elevational view showing an oil delivery system according to a second embodiment of the present invention.

Referring now to FIGS. 4B and 7, an oil delivery system 200 is shown according to an alternative embodiment of the present invention where like numerals represent like parts to the delivery system 10 of FIGS. 1-3, 4A and 6. In this embodiment, the pair of containers 46, 48 are mounted within a housing 202 so that the containers 46, 48 are positioned on their sides with one container 46 supported above the other container 48. The housing 202 includes a pair of opposing sidewalls 204 (one shown), a top wall 206, a bottom wall 208 and a rear wall 210. A shelf 212 is connected to the sidewalls 204 and supports the upper container 46 while the bottom wall 208 supports the lower container 48. Heaters (not shown) may be provided to heat the shelf 212 and the bottom wall 208. Alternatively, heated convection air may be used as described in detail above or any other method suitable for heating the containers 46, 48.

In this alternative embodiment, flexible tubing 214 is provided to fluidly connect the outlets 76, 78 of the upper and lower containers 46, 48 in series to the inlet 88 of the pump 32, and flexible tubing 216 is provided to fluidly connect the outlet 90 of the pump 32 to the oil outlet 42. The tubing 214 has multiple tube sections 214a-c which are interconnected to define a passageway between the outlets 76, 78 of the containers 46, 48 and the inlet 88 of the pump 32. Oil filters 96, 98 are provided in fluid communication with the flexible tubing 214, 216 for purposes as described in detail above. Also, heated coils (not shown) may be provided on the flexible tubing 214, 216.

Tubing section 214a has one quick connect/disconnect connector 218a provided at one end of the tubing section 214a and another quick connect/disconnect connector 218b provided at its opposite end. As shown in FIGS. 4B and 7, the quick connect/disconnect connector 218a provided at the one end of tubing section 214a is fluidly connected with the quick connect/disconnect connector 80 provided on the flexible bag 68 of container 46. When the connection is made, the connector 80 provided on the flexible bag 68 opens so that oil fills the tubing section 218a but the connector 218b prevents the oil from exiting the tubing section 214a until further connections are made as described below.

Tubing section 214b has a pair of quick connect/disconnect connectors 220a, 220b provided at opposite ends of the tubing section 214b and another quick connect/disconnect connector 220c provided between the pair of quick connect/disconnect connectors 220a, 220b. As shown in FIGS. 4B and 7, the quick connect/disconnect connector 220c provided between the pair of quick connect/disconnect connectors 220a, 220b is fluidly connected with the quick connect/disconnect connector 82 provided on the flexible bag 70 of container 48. When the connection is made, the connector 82 provided on the flexible bag 70 opens so that oil fills the tubing section 214b but the connectors 220a, 220b prevent the oil from exiting the tubing section 214b at either end until further connections are made as described below. Tubing section 214c has a quick connect/disconnect connector 222 provided at one end and its opposite end is fluidly connected with the inlet 88 of the pump 32.

As shown in FIGS. 4B and 7, the quick connect/disconnect connector 220a on the end of tube section 214b is fluidly connected with the quick connect/disconnect connector 218b provided on the one end of the tubing section 214a. When this connection is made, the connectors 218b, 220a on the ends of the tubing sections 214a, 214b open so that a passageway is established between the outlets 76, 78 of the containers 46, 48. In this way, the oil from the upper container 46 gravity feeds into the lower container 48.

The quick connect/disconnect connector 220b provided on the other end of the tubing section 214b is fluidly connected to the quick connect/disconnect connector 222 provided on the one end of tubing section 214c. When this connection occurs, the connectors 220b, 222 on the ends of the tubing sections 214b, 214c open so that a passageway is established between the outlets 76, 78 of the containers 46, 48 and the inlet 88 of the pump 32. During operation of the pump 32, oil is drawn from the lower container 48 while the upper container 46 gravity feeds oil to the lower container 48.

In this embodiment, a flow sensor 106 is provided in fluid communication with the tubing section 214a. The flow sensor 106 is operable to detect an absence of flow of oil in the tubing section 214a such as when the upper container 46 is essentially empty of oil. The flow sensor 106 is operable to generate a visual or audible alarm, or both, to an operator as described in detail above to alert the operator to remove and replace the empty upper container 46 with a filled container. In this way, the upper container 46 functions as a primary source of oil and the lower container 48 functions as a temporary oil reserve to reduce or eliminate interruptions in the supply of oil to the kettle 24 during popping cycles. Thus, it will be appreciated that the lower container 48 will need to be replaced much less frequently than the upper container 46. Of course, more than two containers are possible with the oil delivery system 200 of the present invention.

Figure 5:
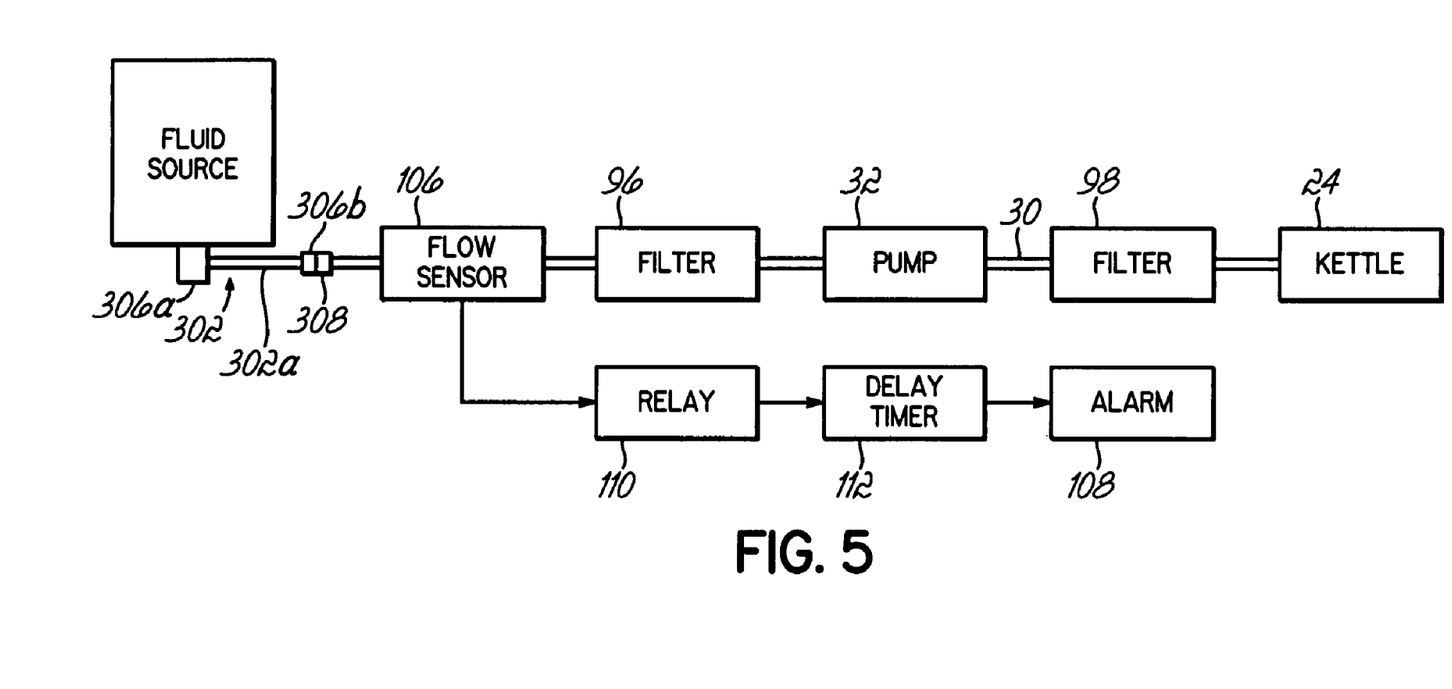
FIG. 5 is a diagrammatic view of a delivery system according to a third embodiment of the present invention.

Referring now to FIG. 5, an oil delivery system 300 in accordance with another aspect of the present invention is shown where like numerals represent like parts to the delivery system 10 of FIGS. 1-3, 4A and 6. In this embodiment, a single container 46 of oil is mounted in a housing (not shown)

either in an inverted position with its top facing downwardly or on its side as described in detail above.

In this alternative embodiment, flexible tubing 302 is provided to fluidly connect the outlet 76 of the container 46 to the inlet 88 of the pump 32, and flexible tubing 304 is provided to fluidly connect the outlet 90 of the pump 32 to the oil outlet 42. The tubing 302 has multiple tube sections 302a, 302b which are interconnected to define a passageway between the outlet 76 of the container 46 and the inlet 88 of the pump 32. As in the other embodiments, oil filters 96, 98 are provided in fluid communication with the flexible tubing 302, 304 to clean the oil and reduce bubbles which may form in the flexible tubing 304 as a result of operation of the pump 32. Also, heated coils (not shown) may be provided on the flexible tubing 302.

Tubing section 302a has a quick connect/disconnect connector 306a provided at one end of the tubing section 302a and another quick connect/disconnect connector 306b provided at its opposite end. As shown in FIG. 5, the quick connect/disconnect connector 306a provided at the one end of tubing section 302a is fluidly connected with the quick connect/disconnect connector 80 provided on the flexible bag 68 of container 48. When the connection is made, the connector 80 provided on the flexible bag 48 opens so that oil fills the tubing section 302a but the connector 306b prevents the oil from exiting the tubing section 302a until further connections are made as described below. Tubing section 302b has a quick connect/disconnect connector 308 provided at one end and its opposite end is fluidly connected with the inlet 88 of the pump 32. Alternatively, the tubing section 302a may be dispensed with and the one end of the tubing section 302b may be provided with the quick connect/disconnect connector 306a for direct fluid connection with the quick connect/disconnect connector 80 provided on the container 46.

In this embodiment, a flow sensor 106 is provided in fluid communication with the tubing section 302b. Alternatively, the flow sensor 106 may be provided in fluid communication with the tubing section 302a. The flow sensor 106 is operable to detect an absence of flow of oil in the tubing section 302b (or tubing section 302a in an alternative embodiment) such as when the container 46 is empty of oil. The flow sensor 106 is operable to generate a visual or audible alarm, or both, to an operator as described in detail above to alert the operator to remove and replace the empty container 46 with a filled container.

While the present invention has been illustrated by the description of an exemplary embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. In a popcorn popping machine, an oil delivery system configured to deliver oil used during a popping cycle to a kettle of the popping machine, comprising:
    a first container of oil having a first outlet oriented along a substantially vertical axis;
    a second container of oil having a second outlet oriented along a substantially vertical axis;
    a pump having an inlet and an outlet and being configured to withdraw oil from said container and deliver the oil to the kettle;
    a first conduit having one end fluidly connected to said first outlet of said first container and an opposite end;
    a second conduit having one end fluidly connected to said second outlet of said second container and an opposite end; and
    a third conduit having a pair of ends each fluidly connected to one of said opposite ends of said first and second conduits and an opposite end fluidly connected to said inlet of said pump; and
    a fourth conduit having one end fluidly connected to said outlet of said pump and an opposite end in fluid communication with said kettle to deliver oil from said first and second containers to said kettle.

2. The delivery system of claim 1 further comprising a flow sensor in fluid communication with said first conduit and being configured to detect an absence of flow of oil in said first conduit.

3. The delivery system of claim 2 further comprising an electronic valve in fluid communication with said second conduit and electrically coupled to said flow sensor, said electronic valve operating in open and closed states to open and close said second conduit and normally being positioned in the closed state to close said second conduit, said electronic valve being responsive to said flow sensor to position said electronic valve in the open state to open said second conduit when said flow sensor detects an absence of flow of oil in said first conduit.

4. The delivery system of claim 1, wherein said first container comprises:
    a first flexible bag having said first outlet in fluid communication with an interior of said first bag containing the oil; and
    a box substantially enclosing said first flexible bag.

5. The delivery system of claim 4, wherein said second container comprises:
    a second flexible bag having said second outlet in fluid communication with an interior of said second bag containing the oil; and
    a box substantially enclosing said second flexible bag.

6. In a popcorn popping machine, an oil delivery system configured to deliver oil used during a popping cycle to a kettle of the popping machine, comprising:
    a first container of oil having a first outlet;
    a second container of oil having a second outlet;
    a pump having an inlet and an outlet and being configured to withdraw oil from said container and deliver the oil to the kettle;
    a first conduit having one end fluidly connected to said first outlet of said first container and an opposite end fluidly connected to said second outlet of said second container; and
    a flow sensor in fluid communication with said first conduit and being configured to detect an absence of flow of oil in said first conduit.

7. The delivery system of claim 6, further comprising an indicator electrically coupled to said flow sensor, said indicator being activated when said flow sensor detects an absence of flow of oil in said first conduit.

8. The delivery system of claim 7, wherein said indicator is configured to provide a visual indication to an operator of the popcorn popping system when said indicator is activated.

9. The delivery system of claim 7, wherein said indicator is configured to provide an audible indication to an operator of the popcorn popping system when said indicator is activated.

10. The delivery system of claim 6, wherein said first container comprises:
- a first flexible bag having said first outlet in fluid communication with an interior of said first bag containing the oil; and
- a box substantially enclosing said first flexible bag.

11. The delivery system of claim 10, wherein said second container comprises:
- a second flexible bag having said second outlet in fluid communication with an interior of said second bag containing the oil; and
- a box substantially enclosing said second flexible bag.

12. In a popcorn popping machine, an oil delivery system configured to deliver oil used during a popping cycle to a kettle of the popping machine, comprising:
- a container of oil having an outlet;
- a passageway having first and second portions configured to convey oil from said outlet of said container to the kettle;
- a flow sensor in fluid communication with the first portion of said passageway and being configured to detect an absence of flow of oil in the first portion of said passageway; and
- an electronic valve in fluid communication with the second portion of said passageway and electrically coupled to said flow sensor, said electronic valve operating in open and closed states to open and close the second portion of said passageway and normally being positioned in the closed state to close the second portion of said passageway, said electronic valve being responsive to said flow sensor to position said electronic valve in the open state to open the second portion of said passageway when said flow sensor detects an absence of flow of oil in the first portion of said passageway.

13. The delivery system of claim 12, wherein said container comprises:
- a flexible bag having said outlet in fluid communication with an interior of said bag containing the oil; and
- a box substantially enclosing said flexible bag.

14. The delivery system of claim 12 further comprising an indicator electrically coupled to said flow sensor, said indicator being activated when said flow sensor detects an absence of flow of oil in said first passageway.

15. The delivery system of claim 14, wherein said indicator is configured to provide a visual indication to an operator of the popcorn popping system when said indicator is activated.

16. The delivery system of claim 14, wherein said indicator is configured to provide an audible indication to an operator of the popcorn popping system when said indicator is activated.

17. A method of delivering oil used during a popping cycle to a kettle of a popcorn popping machine, comprising:
- delivering oil through first and second portions of a passageway from a container of oil to the kettle;
- detecting an absence of flow of oil in the first portion of the passageway with a flow sensor; and
- selectively opening and closing the second portion of the passageway with an electronic valve;
- wherein the electronic valve is responsive to the flow sensor for selectively opening the second portion of the passageway upon the flow sensor detecting an absence of flow of oil in the first portion of the passageway.

* * * * *